United States Patent [19]
Vaessen

[11] 3,744,784
[45] July 10, 1973

[54] MANDREL FOR MAKING SAUSAGE CASINGS AND WIRE STRUCTURE THEREFOR

[75] Inventor: Hubert J. Vaessen, Deventer, Netherlands

[73] Assignee: H. Vaessen N.V., Deventer, Netherlands

[22] Filed: June 25, 1970

[21] Appl. No.: 49,632

Related U.S. Application Data

[62] Division of Ser. No. 658,749, Aug. 7, 1967, Pat. No. 3,526,928.

[52] U.S. Cl............................ 269/47, 17/41, 99/109
[51] Int. Cl............................................... A22c 11/00
[58] Field of Search ................................... 18/14 R; 99/175–176, 109; 269/48.1, 47; 156/457; 93/58 ST, 59 CE, 59 PL; 17/41; 249/175; 53/28

[56] References Cited
UNITED STATES PATENTS

| | | | |
|---|---|---|---|
| 2,006,376 | 7/1935 | Vogt | 53/28 |
| 2,766,568 | 10/1956 | Tasker | 53/28 X |
| 3,427,169 | 2/1969 | Rose et al. | 99/109 X |
| 1,951,646 | 3/1934 | Butler | 249/175 X |
| 329,080 | 10/1885 | Remus | 93/59 ST |
| 2,440,144 | 4/1948 | Hosking | 249/175 X |
| 3,214,277 | 10/1965 | Vaessen | 99/175 |
| 3,526,928 | 9/1970 | Vaessen | 18/14 R |
| 990,547 | 4/1911 | Gunuskey | 17/41 |
| 3,414,936 | 12/1968 | Lugiewicz | 17/41 X |
| 2,446,281 | 8/1948 | Harding | 269/48.1 X |
| 3,496,605 | 2/1970 | Onaka | 93/59 PL |
| 3,203,807 | 8/1965 | Sloan | 17/41 X |

FOREIGN PATENTS OR APPLICATIONS

| | | | |
|---|---|---|---|
| 1,042,957 | 9/1966 | Great Britain | 249/175 |
| 863,291 | 1953 | Germany | 99/176 |
| 572,424 | 6/1962 | Belgium | 99/176 |
| 1,260,341 | 3/1961 | France | 17/41 |

Primary Examiner—Harold D. Whitehead
Assistant Examiner—E. F. Desmond
Attorney—Browdy and Neimark

[57] ABSTRACT

A mandrel for making sausage casings provided with a non-smooth outer surface containing circumferential or longitudinal ribs thereon.

2 Claims, 6 Drawing Figures

PATENTED JUL 10 1973

INVENTOR.
HUBERT J. VAESSEN
BY
Browdy and Neimark
Attorneys

MANDREL FOR MAKING SAUSAGE CASINGS AND WIRE STRUCTURE THEREFOR

The present application is a division and a continuation-in-part of copending application Ser. No. 658,749 filed Aug. 7, 1967 now U.S. Pat. No. 3,526,928, issued Sept. 8, 1970.

This invention relates to mandrels for making sausage casings with the use of intestine strips, and more specifically to mandrels provided with non-smooth outer surfaces.

The production of sausage casings from intestine strips, either alone or with a coating, is well known. The classical process according to which the casing is exclusively made from intestine strips and some embodiments of a more recent process, wherein a layer made from intestine strips is coated with a layer of macromolecular, preferably proteinaceous material are described in e.g. U.S. Pat. No. 3,214,277 which is incorporated herein by reference.

Processes of the above kind are used on a commercial scale, and mandrels of several forms and sizes have been developed and used for these purposes. All these known mandrels are made of wood and they have in common that their surface on which the sausage casing is formed is smooth, and it was always believed a matter of course that this was necessary in order to obtain an acceptable product. In order to promote the releasing of the finished dried casing, several more or less complicated devices were developed which permit changing the circumference of the mandrel. When the product has to be removed from the mandrel, its circumference is reduced, and this reduction serves as a release aid.

Of course, it could be expected that the release of the finished casing would be easier with a mandrel having a non-smooth surface, but it appeared so obvious that with such a mandrel it would be impossible to obtain a good uniform product that even in the first and primitive stages of the development of this kind of process, no expert in this field has ever thought of trying such an apparently useless measure.

Surprisingly, it has now been found that a mandrel having a non-smooth surface provides even better casings than the smooth mandrels. The principal effect of the non-smooth surface is that the air which is always entrapped between two layers of these kinds of casings is now present in the form of smaller bubbles, and, by virtue thereof, the product is stronger and more uniform.

There are many embodiments for the invention and some preferred embodiments will be discussed hereinbelow.

The effect of this invention may be attained to some extent by a simple roughening of the mandrel surface. Thus, the surface may contain small pointlike projections which may be distributed randomly or, preferably, in a regular way. Still better results are obtained if the surface is provided with ribs or ridges in the longitudinal or circumferential direction and most preferably in both directions.

If desired, the above mandrel embodiments may be provided with some known device for changing the circumference of the mandrel in order to further improve the releasing of the casings.

However, this is not essential, and it is one of the advantages of this invention that it is now possible to make a simple massive mandrel without such complicated devices.

Of course, it is not very practical to make a mandrel having ribs or the like on its surface exclusively from wood. It has been ascertained experimentally that other materials are more suitable for the mandrels of the invention, or at least for the projections on their surfaces. One can use any material which is inert to the intestine strips which have been pretreated with acid or lye, in order to make them porous. Thus, the surface which enters into contact with the intestine strips may consist of some suitable metal, e.g., stainless, steel, or of some plastic (or plastic coated metal), such as polytetrafluoroethylene, polyamide, polyalkylene, cross-linked resins, etc.

Thus, it is possible to make the whole mandrel of such other material, but it is equally possible to apply e.g. ribs of such other material on a conventional wooden mandrel. In this last respect there are again two possibilities. A conventional wooden mandrel can be provided with ribs or the like in such a way that they form an integral part of the mandrel, but it is also possible to apply some suitable envelop structure around a conventional mandrel. Such an envelop structure may consist of some open wire mesh construction, wherein the meshes may have any form and their sizes may vary within wide limits.

This last mentioned embodiment has many advantages, because it permits the obtaining of the results of this invention with the use of a conventional mandrel by merely putting a preformed wire structure around it.

Thus, the old conventional mandrels in which much money has been invested can still be used, and it is even possible to continue their production, and to leave the user the choice of using them with or without an enveloping wire structure. It is also possible to make sausage casings of different diameters on one and the same mandrel, simply by using wire structures of different thicknesses. Accordingly, such wire structures constitute the most preferred embodiment of this invention.

According to another embodiment, the mandrel is tubular in form, and preferably made of some material which per se already possesses reasonable release properties for the sausage casing. Most artificial resins satisfy this requirement, but still a tube-or hose-shaped mandrel having a smooth surface would not solve the release problem.

However, if such a tubular body is provided with either circumferential ribs or longitudinal ribs, or both, several unexpected advantages are obtained. With mandrels of these types no release problem exists anymore, and casings of excellent quality are obtained. Moreover, the tubular body, unlike the former mandrels of solid wood or plastic, can be made in practically any length, whereas up till now, due to the release problems, the maximum length of such mandrels was only 50 to 70 centimeters.

Thus, a rigid tubular mandrel of plastic or, e.g., plastic coated metal having a length of about 20 meters can be made which at regular intervals is provided with circumferential ribs.

Some embodiments of the invention have been shown in the accompanying drawings, it being understood that the invention is not limited to the embodiments shown in said drawings since many variations will be obvious to the expert. In the drawings:

FIG. 1 semi-schematically shows some non-smooth surfaces on a mandrel;

Figure 5:
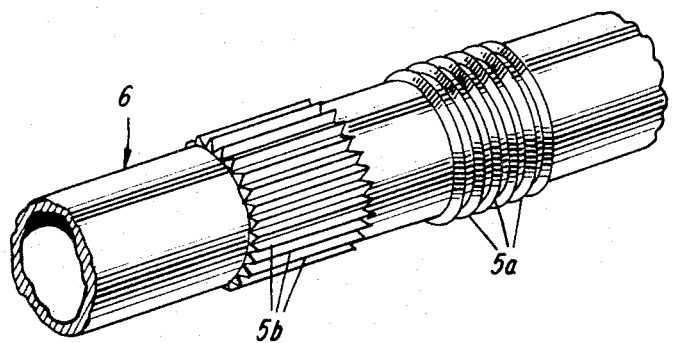
Figure 6:
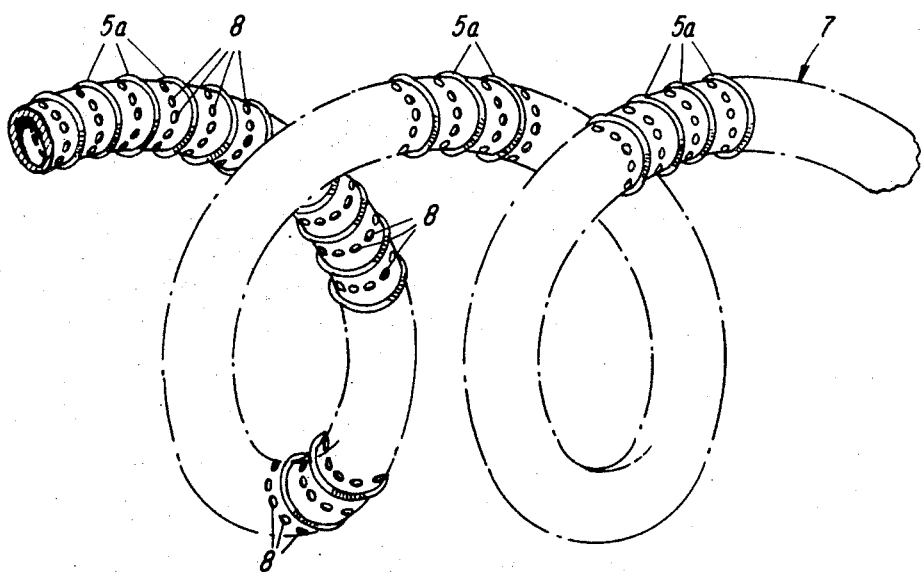

FIG. 5 semi-schematically shows a modified form of mandrel with non-smooth surfaces thereon; and FIG. 6 shows a coil-shaped mandrel incorporating the features of the modified form shown in FIG. 5.

Figure 1:
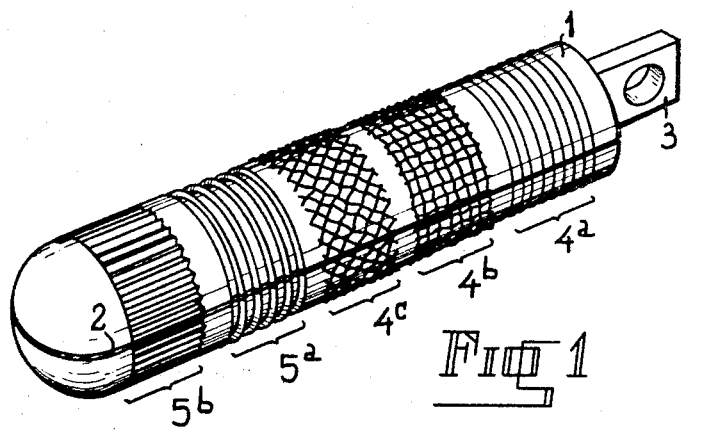

In FIG. 1 the mandrel 1 is made of two halves which can move with respect to each other as shown at 2. The device 3 which is well known per se serves for changing the circumference of the mandrel. As mentioned hereinabove, such a mandrel is usually made from wood.

Figure 2:
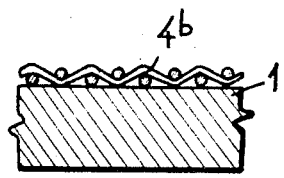
FIG. 2 shows a more detailed view of one of these embodiments in cross-section.

According to the embodiment 4a, metal or plastic wires are removably applied to the mandrel in circumferential direction. In the more preferred embodiment 4b the wires extend both in the circumferential and longitudinal direction, thus forming a mesh structure, which is shown in cross-section in FIG. 2. Another embodiment of such a removable mesh structure is shown with 4c.

Figure 3:
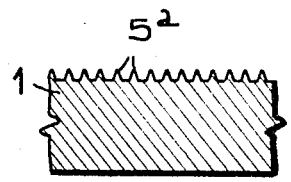
FIG. 3 shows a more detailed view of another of these embodiments in cross-section.

According to the embodiment 5a, the mandrel surface is provided with non-removable circumferential ribs, which are shown in cross-section in FIG. 3. In this embodiment the mandrel, of course, can be made from any material, e.g., some suitable plastic. A similar embodiment, however, with longitudinal ribs is shown in 5b. Of course, the combination of circumferential and longitudinal ribs is also possible, but for reasons of simplicity this embodiment, which for the rest will be clear to the expert, has not been shown in the drawing.

Figure 4:
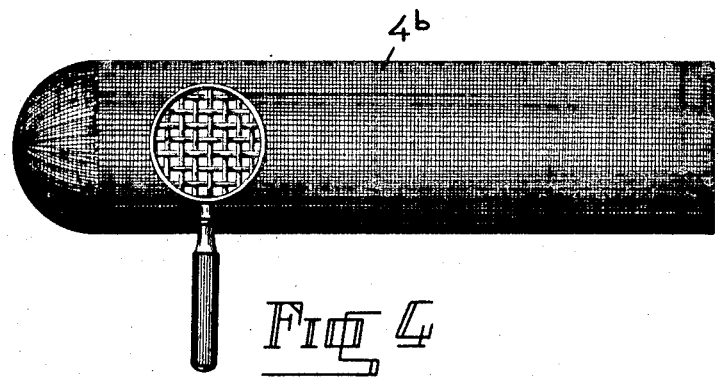
FIG. 4 shows a mandrel entirely provided with a removable wire structure, with a partially enlarged view of said wire structure.

It is to be noted that FIG. 1 basically shows a usual type of mandrel provided with a known device for changing its circumference. However, the necessity of such a conventional device is obviated by the present invention, as has been mentioned hereinbefore. In accordance therewith, FIG. 4 shows a simpler mandrel which has not been provided with such a device. This mandrel may consist of any suitable material such as wood, metal or plastic. Around this mandrel an exchangeable wire construction 4b has been applied.

According to the form of the invention shown in FIGS. 5 and 6, the mandrel 6 is tubular in form preferably made from a rigid plastic. The plastic may be a thermoplastic material, such as nylon, or a thermosetting material such as cured polyester resin.

In the case of a thermosetting material, the final cure should, of course, only be performed after the mandrel has obtained its definitive shape. The tubular body is provided with circumferential ribs 5a or longitudinal ribs 5b. Circumferential ribs are preferred. The ribs 5a can be evenly distributed over the surface of the tubular body, or there may be alternate portions provided with ribs, and portions without ribs, these portions having the same or different lengths.

A coil-shaped mandrel is shown in FIG. 6. The coil consists of a tubular body 7 of rigid plastic material, provided with ribs. Also in this case the ribs may be longitudinal or circumferential, but for the sake of simplicity only circumferential ribs 5a have been shown in the drawing. Furthermore, it is in this case especially preferred to have the mandrel provided with apertures, and such apertures 8 are also shown in the drawing. When using such a mandrel, it is suspended in some suitable way, wherein it can be rotated freely, so that it is possible to lay the strips of intestines over the entire surface thereof. To this end the distance between the windings of the coil should also be sufficient so that the person who lays the strips on the mandrel can pass his hands between the windings. Surprisingly, it has been found that even with such a relatively complicated structure, the finished casing can be released from the mandrel without special difficulties.

In case of necessity which may occur with these coil-shaped mandrels, it is always possible to facilitate the release of the casing by moistening the casing again after it has been fully dried. A previous complete drying is necessary, because otherwise no good adherence of the intestine strips to each other is obtained or no complete curing of a possibly applied coating of animal proteinaceous material, and for the same reasons the drying should be carried out on the mandrel. However, once the casing has been dried, it can be moistened again, without harm. After its release from the mandrel, it is then dried again.

Such a coil-shaped mandrel can be made by first producing a tube of a rigid thermoplastic material, and then subjecting this tube to a vacuum molding treatment, wherein simultaneously the desired ribs are produced and the tube is bent to the ultimately desired coil form. On such a mandrel it is now possible to make an artificial casing in the same form as the natural beef intestine, which casing consists of natural intestine material, if desired, with a proteinaceous coating which is also of animal origin.

Not only is it possible to make in this way a length of sausage casing of 20 m, but according to a particular embodiment, it is possible to make a length of 20 meters or more. To this end, the originally made length of 20 meters is not entirely drawn from the mandrel, but the last 50 cm or so is left on the mandrel. Thereafter, a next length of about 19.5 m is made adjacent to these 50 cm and with a small overlap. By repeating this process, a number of times, lengths of over 100 meters of sausage casings can be produced in a simple way. With the small lengths of this type of casing which were available up till now, it was virtually indispensable both from an economical and from a technical point of view to use mandrels with a rounded end in order to make casings with one closed end. From an economical point of view this was necessary, because it was only possible to make small lengths of casing at a time so that it would have been prohibitively expensive to make casing with two open ends which later on have to be closed by tying on both ends which means additional loss of the relatively expensive materials from which this kind of casing is made. From a technical point of view, it was also practically a "must" to make the casings with one closed end because of the limited lengths which could be made anyway, and which had accordingly to be kept at the maximum available. These considerations are no longer valid with the present mandrels according to FIG. 6. The simple expedient of using a tubular mandrel provided with ribs on its outer surface reverses the above-mentioned technical and economical considerations. With these mandrels, much greater lengths of casings are made with much less expense per unit of length, even though the casings are still open at both ends.

The process of sausage making is nowadays carried out as automatically as possible. Machines are available which deliver metered dosages of sausage filling to the casing, and then automatically cut after the desired length with the aid of clips. Up till now casings of the present types could not be used with such machines. However, for the first time since the development of this kind of casings, about 30 years ago, this has now become possible.

Although this is not essential, the tubular mandrels can also be provided with small apertures, perforations or the like on those parts of the surface which are not provided with ribs. This permits a better and quicker escape of the air during the length of the intestine strips around the mandrels. The presence of these apertures is particularly preferred in the case of a mandrel provided with circumferential ribs.

A special natural casing is the coil-shaped beef intestine. These intestines are also called "beef rounds." By their shape they form a very attractive kind of casing, but this portion of the beef intestine contains much fat which cannot be removed without unduly weakening the intestines. Due to the presence of this fat, casings consisting of such intestines tend to become rancid within a short time so that they only have a limited shelf life. Accordingly, artificial casings of this form have also been made, i.e., casings consisting entirely of non-intestine material. However, up till now all efforts to make such casings with the use of strips of intestine have failed because of the release problem.

Surprisingly, this problem has now been solved by the tubular mandrels, containing circumferential and/or longitudinal ribs on their outer surface.

It will be obvious to those skilled in the art that various changes may be made without departing from the scope of the invention and the invention is not to be considered limited to what is shown in the drawings and described in the specification.

What is claimed is:

1. A mandrel for making sausage casings by wrapping intestine strips about said mandrel comprising an elongated cylindrical body portion formed as a coil and having a hollow tubular form and means for producing a stronger and more uniform sausage casing and improving release of the casing from the mandrel comprising a non-smooth outer surface on said body portion, said surface comprising circumferential ribs thereon integral with the mandrel.

2. A mandrel according to claim 1 wherein said body portion has a plurality of apertures therethrough between the ribs.

* * * * *